(12) United States Patent
Bodini et al.

(10) Patent No.: US 12,399,361 B2
(45) Date of Patent: Aug. 26, 2025

(54) DISTRIBUTED OPTICAL ARCHITECTURE FOR VEHICLE HEAD UP DISPLAY

(71) Applicant: Infineon Technologies AG, Neubiberg (DE)

(72) Inventors: Emanuele Bruno Bodini, Munich (DE); Boris Kirillov, Gratwein-Straßengel (AT)

(73) Assignee: Infineon Technologies AG, Neubiberg (DE)

( * ) Notice: Subject to any disclaimer, the term of this patent is extended or adjusted under 35 U.S.C. 154(b) by 420 days.

(21) Appl. No.: 18/152,908

(22) Filed: Jan. 11, 2023

(65) Prior Publication Data

US 2024/0231084 A1    Jul. 11, 2024

(51) Int. Cl.
| | | |
|---|---|---|
| G02B 27/00 | (2006.01) | |
| G02B 26/08 | (2006.01) | |
| G02B 26/10 | (2006.01) | |
| G02B 27/01 | (2006.01) | |
| G02B 27/28 | (2006.01) | |
| B60K 35/00 | (2006.01) | |
| B60K 35/23 | (2024.01) | |

(52) U.S. Cl.
CPC ..... *G02B 27/0101* (2013.01); *G02B 26/0833* (2013.01); *G02B 26/105* (2013.01); *G02B 27/288* (2013.01); *B60K 35/00* (2013.01); *B60K 35/23* (2024.01); *B60K 2360/23* (2024.01); *B60K 2360/25* (2024.01); *G02B 2027/0112* (2013.01)

(58) Field of Classification Search
CPC ............ G02B 27/0101; G02B 26/0833; G02B 26/105; G02B 27/288; G02B 2027/0112; B60K 2360/25; B60K 35/23; B60K 2360/23; B60K 35/00
USPC ....................................................... 359/201.2
See application file for complete search history.

(56) References Cited

U.S. PATENT DOCUMENTS

| 11,682,357 | B1* | 6/2023 | Seo ........................ | B60K 35/00 |
|---|---|---|---|---|
| | | | | 345/694 |
| 2018/0157036 | A1* | 6/2018 | Choi ...................... | G09G 3/001 |
| 2018/0284436 | A1 | 10/2018 | Ichinokawa | |
| 2019/0129169 | A1* | 5/2019 | Kusafuka ............... | B60K 35/23 |
| 2020/0189363 | A1* | 6/2020 | Sugiyama ............. | G02B 5/3025 |
| 2020/0192093 | A1* | 6/2020 | Lee ..................... | G02B 27/0103 |
| 2020/0326538 | A1* | 10/2020 | Stamm ............... | G02B 27/0093 |
| 2021/0041707 | A1* | 2/2021 | Misawa ............... | B60K 35/235 |
| 2021/0389596 | A1* | 12/2021 | Fujita ..................... | B60K 35/10 |

(Continued)

*Primary Examiner* — Daniel A Hess
(74) *Attorney, Agent, or Firm* — Harrity & Harrity, LLP

(57) ABSTRACT

A vehicle includes a vehicle chassis that defines an in-cabin volume of the vehicle; a windshield mounted to the vehicle chassis; a dashboard including a dashboard interior volume that is separated from the in-cabin volume; a head-up display (HUD) reflector arranged within the dashboard interior volume; and an image generation unit configured to generate a plurality of pixel light beams corresponding to an image and transmit the plurality of pixel light beams on an optical path towards the HUD reflector. The image generation unit is arranged within the in-cabin volume and external to the dashboard interior volume. The HUD reflector is configured to receive the plurality of pixel light beams from the image generation unit and project the image onto the windshield by reflecting the plurality of pixel light beams back into the in-cabin volume and onto the windshield.

21 Claims, 5 Drawing Sheets

(56) References Cited

U.S. PATENT DOCUMENTS

| | | | |
|---|---|---|---|
| 2022/0107497 A1* | 4/2022 | Murata | B60K 35/00 |
| 2022/0146818 A1* | 5/2022 | Inoue | B60K 35/231 |
| 2022/0229293 A1* | 7/2022 | Xu | G02B 27/0101 |
| 2022/0350139 A1* | 11/2022 | Tsuda | B60Q 9/00 |
| 2022/0350154 A1* | 11/2022 | Pankratz | G02B 27/0101 |
| 2023/0139649 A1* | 5/2023 | Ronen | B60K 35/50 |
| | | | 701/36 |
| 2023/0296891 A1* | 9/2023 | Lambert | G02B 27/0101 |
| | | | 359/630 |
| 2023/0384585 A1* | 11/2023 | Ma | G02B 27/0101 |
| 2024/0103268 A1* | 3/2024 | Kawai | G02B 27/0101 |
| 2024/0264436 A1* | 8/2024 | Husson | G02B 27/0101 |
| 2024/0280808 A1* | 8/2024 | Nishimura | G02B 27/01 |
| 2024/0385435 A1* | 11/2024 | Nishizawa | B60K 35/235 |

\* cited by examiner

DISTRIBUTED OPTICAL ARCHITECTURE FOR VEHICLE HEAD UP DISPLAY

BACKGROUND

Augmented reality (AR) is a technology that augments physical environments on a mobile device screen by overlaying them with digital content. It adds digital elements to a live view. For example, a captured piece of an environment is augmented with digital information that is superimposed thereon. Thus, digital content is overlaid onto the captured piece of the environment to visually provide additional information to a user. The digital content may be displayed on a transparent substrate or display, such as smart eyeglasses, smart contact lenses, head-up displays (HUDs), and head-mounted displays (HMDs), or projected directly onto a user's retina, as is the case for virtual retinal displays.

Virtual reality (VR) is a technology that entirely replaces the real-world environment of a user with a computer-generated virtual environment. Thus, a user is presented with a completely digital environment. In particular, computer-generated stereo visuals entirely surround the user. In a VR simulated environment, a VR headset that provides 360-degree vision may be used.

A mixed reality (MR) experience combines elements of both AR and VR such that real-world and digital objects interact. Here, a real-world environment is blended with a virtual one.

These technologies, as well as others that enhance a user's senses, may be referred to as extended reality (XR) technologies.

SUMMARY

In some implementations, a vehicle includes a vehicle chassis that defines an in-cabin volume of the vehicle; a windshield mounted to the vehicle chassis; a dashboard including a dashboard interior volume that is separated from the in-cabin volume; a head-up display (HUD) reflector arranged within the dashboard interior volume; and an image generation unit configured to generate a plurality of pixel light beams corresponding to an image and transmit the plurality of pixel light beams on an optical path towards the HUD reflector, wherein the image generation unit is arranged within the in-cabin volume and external to the dashboard interior volume, wherein the optical path includes a first portion that is provided in the in-cabin volume and external to the dashboard interior volume and a second portion that is provided in the dashboard interior volume, and wherein the HUD reflector is arranged on the second portion of the optical path and the HUD reflector is configured to receive the plurality of pixel light beams from the image generation unit and project the image onto the windshield by reflecting the plurality of pixel light beams back into the in-cabin volume and onto the windshield.

In some implementations, a vehicle includes a vehicle chassis that defines an in-cabin volume of the vehicle; a windshield mounted to the vehicle chassis; a dashboard including a dashboard volume; a head-up display (HUD) reflector arranged within the dashboard volume; and an image generation unit configured to generate a plurality of pixel light beams corresponding to an image and transmit the plurality of pixel light beams on an optical path towards the HUD reflector, wherein the image generation unit is arranged within the in-cabin volume, wherein the optical path includes a first portion that is provided in the in-cabin volume and a second portion that is provided in the dashboard volume, and wherein the HUD reflector is arranged on the second portion of the optical path and the HUD reflector is configured to receive the plurality of pixel light beams from the image generation unit and project the image onto the windshield by reflecting the plurality of pixel light beams onto the windshield.

BRIEF DESCRIPTION OF THE DRAWINGS

Implementations are described herein making reference to the appended drawings.

DETAILED DESCRIPTION

Figure 1A:
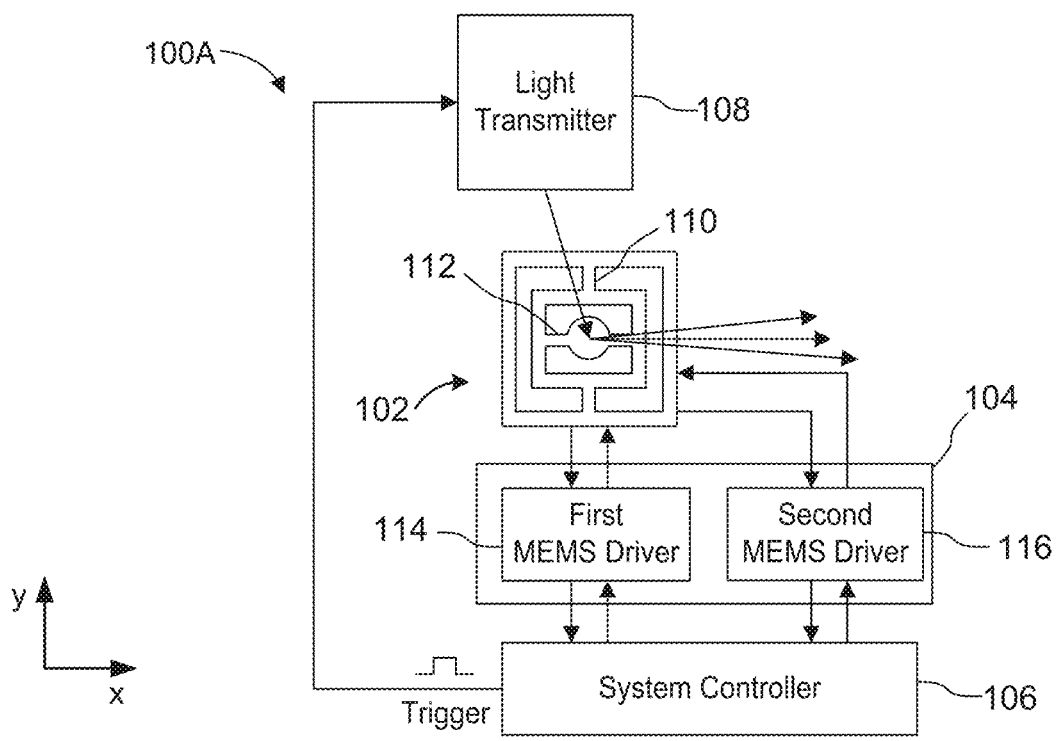
FIG. 1A is a schematic block diagram of a 2D scanning systems according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top," "bottom," "below," "above," "front," "behind," "back," "leading," "trailing," etc., may be used with reference to an orientation of the figures being described. Because parts of the implementations, described herein, can be positioned in a number of different orientations, the directional terminology is used for purposes of illustration and is in no way limiting. It is to be understood that other implementations may be utilized and structural or logical changes may be made without departing from the scope defined by the claims. The following detailed description, therefore, is not to be taken in a limiting sense.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A head-up display (HUD), sometimes referred to as a heads-up display, is any transparent display that presents data without requiring users to look away from their usual viewpoints. For example, a HUD may be used in a vehicle to display images on a windshield.

An entire HUD system may be integrated in a single box under a dashboard (e.g., inside a dashboard interior volume) that is separated from the rest of an interior volume of the vehicle (e.g., a passenger compartment) by a dashboard housing. A delivered field-of-view (FOV) of a reflector-based HUD architecture is proportional to a size of a HUD reflector (e.g., a HUD mirror) used to reflect light onto the windshield. The delivered FOV is a size or two-dimensional are of an image projected onto the windshield. Therefore, the delivered FOV of the reflector-based HUD architecture is proportional to a size of an optical volume between a light transmitter and the HUD reflector. Since a space of the dashboard interior volume is limited, the optical volume between a light transmitter and the HUD reflector is limited by the space of the dashboard interior volume. As a result, the delivered FOV is also limited, leading to smaller images. For example, the delivered FOV may be limited to a 10°×5° projection. Smaller images typically mean that less content can be projected onto the display at any given time. Finding larger volumes inside the dashboard interior volume to enable larger delivered FOVs is often not possible.

Some implementations disclosed herein are directed to an image projection system that uses a reflector-based HUD that includes a HUD reflector arranged within a dashboard interior volume and includes a light transmitter arranged within an in-cabin volume but external to the dashboard interior volume. In other words, the image projection system includes an optical path between the light transmitter and the HUD reflector that includes a first portion that is provided in the in-cabin volume and external to the dashboard interior volume and a second portion that is provided in the dashboard interior volume. As a result, a distance between the light transmitter and the HUD reflector is not limited by the dashboard interior volume and can be increased. The increased distance between the light transmitter and the HUD reflector relaxes optical aberrations and as a result enables achieving a larger FOV in HUD projection. In addition, the HUD reflector may be a single (e.g. one-piece) mirror, which avoids using a complex design of folding mirrors to increase image size. As a result, the image projection system can be simplified, thereby reducing manufacturing costs, while achieving larger images. Additionally, by positioning the light transmitter and other image generation components outside of the dashboard interior volume, a design that reduces sun load (e.g., ambient light) can be simplified.

FIG. 1A is a schematic block diagram of a 2D scanning system 100A according to one or more implementations. In particular, the 2D scanning system 100A includes a microelectromechanical system (MEMS) mirror 102 implemented as a single scanning structure that is configured to steer or otherwise deflect light beams according to a 2D scanning pattern. The 2D scanning system 100A further includes a MEMS driver system 104, a system controller 106, and a light transmitter 108.

In the example shown in FIG. 1A, the MEMS mirror 102 is a mechanical moving mirror (e.g., a MEMS micro-mirror) integrated on a semiconductor chip (not shown). The MEMS mirror 102 is configured to rotate or oscillate via rotation about two scanning axes that are typically orthogonal to each other. For example, the two scanning axes may include a first scanning axis 110 that enables the MEMS mirror 102 to steer light in a first scanning direction (e.g., an x-direction) and a second scanning axis 112 that enables the MEMS mirror 102 to steer light in a second scanning direction (e.g., a y-direction). As a result, the MEMS mirror 102 can direct light beams in two dimensions according to the 2D scanning pattern and may be referred to as a 2D MEMS mirror.

A scan can be performed to illuminate an area referred to as a field of view. The scan, such as an oscillating horizontal scan (e.g., from left to right and right to left of a field of view), an oscillating vertical scan (e.g., from bottom to top and top to bottom of a field of view), or a combination thereof (e.g., a Lissajous scan or a raster scan) can illuminate the field of view in a continuous scan fashion. In some implementations, the 2D scanning system 100A may be configured to transmit successive light beams, for example, as successive light pulses, in different scanning directions to scan the field of view. In other words, the field of view can be illuminated by a scanning operation. In general, an entire field of view represents a scanning area defined by a full range of motion of the MEMS mirror 102 at which the MEMS mirror 102 is driven. Thus, the entire field of view is delineated by a left edge, a right edge, a bottom edge, and a top edge. The entire field of view can also be referred to as a field of illumination or as a projection area in a projection plane onto which an image is projected.

The MEMS mirror 102 can direct a transmitted light beam at a desired 2D coordinate (e.g., an x-y coordinate) in the field of view. In image projection systems, the desired 2D coordinate may correspond to an image pixel of a projected image, with different 2D coordinates corresponding to different image pixels of the projected image. Accordingly, multiple light beams transmitted at different transmission times can be steered by the MEMS mirror 102 at the different 2D coordinates of the field of view in accordance with the 2D scanning pattern. The MEMS mirror 102 can be used to scan the field of view in both scanning directions by changing an angle of deflection of the MEMS mirror 102 on each of the first scanning axis 110 and the second scanning axis 112.

A rotation of the MEMS mirror 102 on the first scanning axis 110 may be performed between two predetermined extremum deflection angles (e.g., +/−5 degrees, +/−15 degrees, etc.). Likewise, a rotation of the MEMS mirror 102 on the second scanning axis 112 may be performed between two predetermined extremum deflection angles (e.g., +/−5 degrees, +/−15 degrees, etc.). In some implementations, depending on the 2D scanning pattern, the two predetermined extremum deflection angles used for the first scanning axis 110 may be the same as the two predetermined extremum deflection angles used for the second scanning axis 112. In some implementations, depending on the 2D scanning pattern, the two predetermined extremum deflection angles used for the first scanning axis 110 may be different from the two predetermined extremum deflection angles used for the second scanning axis 112.

In some implementations, the MEMS mirror 102 can be a resonator (e.g., a resonant MEMS mirror) configured to oscillate side-to-side about the first scanning axis 110 at a first frequency (e.g., a first resonance frequency) and configured to oscillate side-to-side about the second scanning axis 112 at a second frequency (e.g., a second resonance frequency). Thus, the MEMS mirror 102 can be continuously driven about the first scanning axis 110 and the second scanning axis 112 to perform a continuous scanning operation. As a result, light beams reflected by the MEMS mirror 102 are scanned into the field of view in accordance with the 2D scanning pattern.

Different frequencies or a same frequency may be used for the first scanning axis 110 and the second scanning axis 112 for defining the 2D scanning pattern. For example, a raster scanning pattern or a Lissajous scanning pattern may be achieved by using different frequencies for the first frequency and the second frequency. Raster scanning and Lissajous scanning are two types of scanning that can be implemented in display applications, light scanning applications, and light steering applications, to name a few. As an example, Lissajous scanning is typically performed using two resonant scanning axes which are driven at different constant scanning frequencies with a defined fixed frequency ratio therebetween that forms a specific Lissajous pattern and frame rate. In order to properly carry out the Lissajous scanning and the raster scanning, synchronization of the two scanning axes is performed by the system controller 106 in conjunction with transmission timings of the light transmitter 108.

For each respective scanning axis, including the first scanning axis 110 and the second scanning axis 112, the MEMS mirror 102 includes an actuator structure used to drive the MEMS mirror 102 about the respective scanning axis. Each actuator structure may include interdigitated finger electrodes made of interdigitated mirror combs and frame combs to which a drive voltage (e.g., an actuation signal or driving signal) is applied by the MEMS driver system 104. Applying a difference in electrical potential between interleaved mirror combs and frame combs creates a driving force between the mirror combs and the frame combs, which creates a torque on a mirror body of the MEMS mirror 102 about the intended scanning axis. The drive voltage can be toggled between two voltages, resulting in an oscillating driving force. The oscillating driving force causes the MEMS mirror 102 to oscillate back and forth on the respective scanning axis between two extrema. Depending on the configuration, this actuation can be regulated or adjusted by adjusting the drive voltage off time, a voltage level of the drive voltage, or a duty cycle.

In other examples, the MEMS mirror 102 may use other actuation methods to drive the MEMS mirror 102 about the respective scanning axes. For example, these other actuation methods may include electromagnetic actuation and/or piezoelectric actuators. In electromagnetic actuation, the MEMS mirror 102 may be immersed in a magnetic field, and an alternating electric current through conductive paths may create the oscillating torque around the scanning axis. Piezoelectric actuators may be integrated in leaf springs of the MEMS mirror 102, or the leaf springs may be made of piezoelectric material to produce alternating beam bending forces in response to an electrical signal to generate the oscillation torque.

The MEMS driver system 104 is configured to generate driving signals (e.g., actuation signals) to drive the MEMS mirror 102 about the first scanning axis 110 and the second scanning axis 112. In particular, the MEMS driver system 104 is configured to apply the driving signals to the actuator structure of the MEMS mirror 102. In some implementations, the MEMS driver system 104 includes a first MEMS driver 114 configured to drive the MEMS mirror 102 about the first scanning axis 110 and a second MEMS driver 116 configured to drive the MEMS mirror 102 about the second scanning axis 112. In implementations in which the MEMS mirror 102 is used as an oscillator, the first MEMS driver 114 configured to drive an oscillation of the MEMS mirror 102 about the first scanning axis 110 at the first frequency, and the second MEMS driver 116 is configured to drive an oscillation of the MEMS mirror 102 about the second scanning axis 112 at the second frequency.

The first MEMS driver 114 may be configured to sense a first rotational position of the MEMS mirror 102 about the first scanning axis 110 and provide first position information indicative of the first rotational position (e.g., tilt angle or degree of rotation about the first scanning axis 110) to the system controller 106. Similarly, the second MEMS driver 116 may be configured to sense a second rotational position of the MEMS mirror 102 about the second scanning axis 112 and provide second position information indicative of the second rotational position (e.g., tilt angle or degree of rotation about the second scanning axis 112) to the system controller 106.

The system controller 106 may use the first position information and the second position information to trigger light beams at the light transmitter 108. For example, the system controller 106 may use the first position information and the second position information to set a transmission time of light transmitter 108 in order to target a particular 2D coordinate of the 2D scanning pattern. Thus, a higher accuracy in position sensing of the MEMS mirror 102 by the first MEMS driver 114 and the second MEMS driver 116 may result in the system controller 106 providing more accurate and precise control of other components of the 2D scanning system 100A.

As noted above, the first MEMS driver 114 and the second MEMS driver 116 may apply a drive voltage to a corresponding actuator structure of the MEMS mirror 102 as the driving signal to drive a rotation (e.g., an oscillation) of the MEMS mirror 102 about a respective scanning axis (e.g., the first scanning axis 110 or the second scanning axis 112). The drive voltage can be switched or toggled between a high-voltage (HV) level and a low-voltage (LV) level resulting in an oscillating driving force. In some implementations, the LV level may be zero (e.g., the drive voltage is off), but is not limited thereto and could be a non-zero value. When the drive voltage is toggled between an HV level and an LV level and the LV level is set to zero, it can be said that the drive voltage is toggled on and off (HV on/off). The oscillating driving force causes the MEMS mirror 102 to oscillate back and forth on the first scanning axis 110 or the second scanning axis 112 between two extrema. The drive voltage may be a constant drive voltage, meaning that the drive voltage is the same voltage when actuated (e.g., toggled on) or one or both of the HV level or the LV level of the drive voltage may be adjustable. However, it will be understood that the drive voltage is being toggled between the HV level and the LV level in order to produce the mirror oscillation. Depending on a configuration, this actuation can be regulated or adjusted by the system controller 106 by adjusting the drive voltage off time, a voltage level of the drive voltage, or a duty cycle. As noted above, frequency and phase of the drive voltage can also be regulated and adjusted.

In some implementations, the system controller 106 is configured to set a driving frequency of the MEMS mirror 102 for each scanning axis and is capable of synchronizing the oscillations about the first scanning axis 110 and the second scanning axis 112. In particular, the system controller 106 may be configured to control an actuation of the MEMS mirror 102 about each scanning axis by controlling the driving signals. The system controller 106 may control the frequency, the phase, the duty cycle, the HV level, and/or the LV level of the driving signals to control the actuations about the first scanning axis 110 and the second scanning axis 112. The actuation of the MEMS mirror 102 about a particular scanning axis controls its range of motion and scanning rate about that particular scanning axis.

For example, to make a Lissajous scanning pattern reproduce itself periodically with a frame rate frequency, the first frequency at which the MEMS mirror 102 is driven about the first scanning axis 110 and the second frequency at which the MEMS mirror 102 is driven about the second scanning axis 112 are different. A difference between the first frequency and the second frequency is set by a fixed frequency ratio that is used by the 2D scanning system 100A to form a repeatable Lissajous pattern (frame) with a frame rate. A new frame begins each time the Lissajous scanning pattern restarts, which may occur when a phase difference between a mirror phase about the first scanning axis 110 and a mirror phase about the second scanning axis 112 is zero. The system controller 106 may set the fixed frequency ratio and synchronize the oscillations about the first scanning axis 110 and the second scanning axis 112 to ensure this fixed frequency ratio is maintained based on the first position information and the second position information received from the first MEMS driver 114 and the second MEMS driver 116, respectively.

The light transmitter 108 may be a red-green-blue (RGB) light transmitter having red (R), green (G), and blude (B) light sources configured to generate RGB light beams. For example, the light transmitter 108 may include a red laser diode or light emitting diode for generating a red light beam, a green laser diode or light emitting diode for generating a green light beam, a blue laser diode or light emitting diode for generating a blue light beam, and first optical elements that combine the three colored light beams into an RGB light beam for output from the light transmitter 108. Accordingly, the light transmitter 108 is configured to transmit each RGB light beam on a transmission path towards the MEMS mirror 102. Each RGB light beam may be generated as a light pulse, and the light transmitter 108 may sequentially transmit multiple RGB light beams as the MEMS mirror 102 changes its transmission direction in order to target different 2D coordinates. A transmission sequence of the multiple RGB light beams and a timing thereof may be implemented by the light transmitter 108 according to a trigger signal received from the system controller 106.

It is to be noted that a particular RGB light beam may be made of a single color of light, a combination of two colors of light, or a combination of all three colors or light. For example, the system controller 106 may control which R, G, B light sources of the light transmitter 108 is triggered for a light transmission, including some or all of the R, G, B light sources. While some of the R, G, B light sources may remain inactive during a light transmission, an output light beam may still be referred to as an RGB light beam (e.g., despite not including all three colors of light). Alternatively, an "RGB light beam" may be referred to as a "pixel light beam" that includes one or more colors of light depending on the desired pixel color to be projected into the field of view. For example, a particular RGB light beam may correspond to a pixel of an image projected into the field of view or an image projected onto a display and different RGB light beams may be transmitted for different pixels of the image or for different image frames. Thus, the terms "RGB light beam" and "pixel light beam" can be used interchangeably.

The system controller 106 is configured to control components of the 2D scanning system 100A. In certain applications, the system controller 106 may also be configured to receive programming information with respect to the 2D scanning pattern and control a timing of the plurality of light beams generated by the light transmitter 108 based on the programming information. Thus, the system controller 106 may include both processing and control circuity that is configured to generate control signals for controlling the light transmitter 108, the first MEMS driver 114, and the second MEMS driver 116.

The system controller 106 is configured to set the driving frequencies of the MEMS mirror 102 for the first scanning axis 110 and the second scanning axis 112 and is capable of synchronizing the oscillations about the first scanning axis 110 and the second scanning axis 112 to generate the 2D scanning pattern. In some implementations, in which the plurality of light beams is used, the system controller 106 may be configured to generate the trigger signal used for triggering the light transmitter 108 to generate the plurality of light beams.

Using the trigger signal, the system controller 106 can control the transmission times of the plurality of light beams (e.g., RGB light beams or pixel light beams) of the light transmitter 108 to achieve a desired illumination pattern within the field of view. The desired illumination pattern is produced by a combination of the 2D scanning pattern produced by the MEMS mirror 102 and the transmission times triggered by the system controller 106. In some implementations in which the continuous light beam is used, the system controller 106 may be configured to control a frequency modulation of the continuous light beam via a control signal provided to the light transmitter 108.

As indicated above, FIG. 1A is provided merely as an example. Other examples are possible and may differ from what was described with regard to FIG. 1A. In practice, the 2D scanning system 100A may include additional components, fewer components, different components, or differently arranged components than those shown in FIG. 1A without deviating from the disclosure provided above. In addition, in some implementations, the 2D scanning system 100A may include one or more additional 2D MEMS mirrors or one or more additional light transmitters used to scan one or more additional field of views. Additionally, two or more components shown in FIG. 1A may be implemented within a single component, or a single component shown in FIG. 1A may be implemented as multiple, distributed components. Additionally, or alternatively, a set of components (e.g., one or more components) of the 2D scanning system 100A may perform one or more functions described as being performed by another set of components of the 2D scanning system 100A.

Figure 1B:
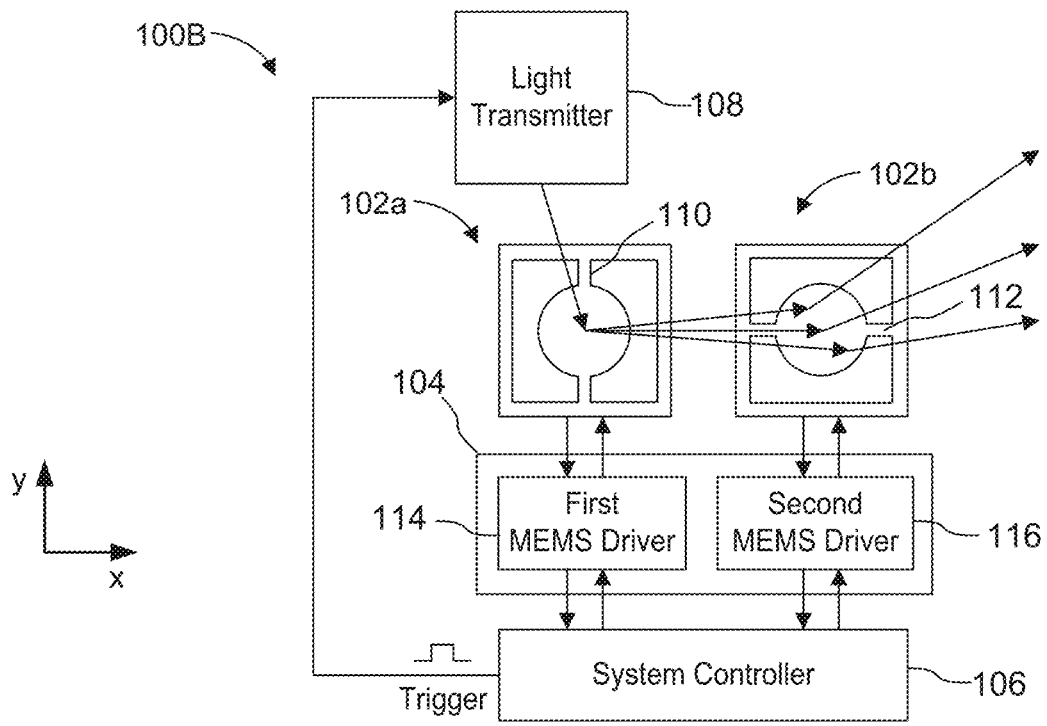
FIG. 1B is a schematic block diagram of a 2D scanning systems according to one or more implementations.

FIG. 1B is a schematic block diagram of a 2D scanning system 100B according to one or more implementations. In particular, the 2D scanning system 100B includes two MEMS mirrors, a first MEMS mirror 102a and a second MEMS mirror 102b, that are optically coupled in series to steer or otherwise deflect light beams according to a 2D scanning pattern. The first MEMS mirror 102a and the second MEMS mirror 102b are similar to the MEMS mirror 102 described in FIG. 1A, with the exception that the first MEMS mirror 102a and the second MEMS mirror 102b are configured to rotate about a single scanning axis instead of two scanning axes. The first MEMS mirror 102a is configured to rotate about the first scanning axis 110 to steer light in the x-direction and the second MEMS mirror 102b is configured to rotate about the second scanning axis 112 to steer light in the y-direction. Similar to the MEMS mirror 102 described in FIG. 1A, the first MEMS mirror 102a and the second MEMS mirror 102b may be resonant MEMS mirrors configured to oscillate about the first scanning axis 110 and the second scanning axis 112, respectively.

Because each of the first MEMS mirror 102a and the second MEMS mirror 102b is configured to rotate about a single scanning axis, each of the first MEMS mirror 102a and the second MEMS mirror 102b is responsible for scanning light in one dimension. As a result, the first MEMS mirror 102a and the second MEMS mirror 102b may be referred to as one-dimensional (1D) MEMS mirrors. In the example shown in FIG. 1B, the first MEMS mirror 102a and the second MEMS mirror 102b are used together to steer light beams in two dimensions. The first MEMS mirror 102a and the second MEMS mirror 102b are arranged sequentially along a transmission path of the light beams such that one of the MEMS mirrors (e.g., the first MEMS mirror 102a) first receives a light beam and steers the light beam in a first dimension and the second one of the MEMS mirrors (e.g., the second MEMS mirror 102b) receives the light beam from the first MEMS mirror 102a and steers the light beam in a second dimension. As a result, the first MEMS mirror 102a and the second MEMS mirror 102b operate together to steer the light beam generated by the light transmitter 108 in two dimensions. In this way, the first MEMS mirror 102a and the second MEMS mirror 102b can direct the light beam at a desired 2D coordinate (e.g., an x-y coordinate) in the field of view. Multiple light beams can be steered by the first MEMS mirror 102a and the second MEMS mirror 102b at different 2D coordinates of a 2D scanning pattern.

The MEMS driver system 104, the system controller 106, and the light transmitter 108 are configured to operate as similarly described above in reference to FIG. 1A. The first MEMS driver 114 is electrically coupled to the first MEMS mirror 102a to drive the first MEMS mirror 102a about the first scanning axis 110 and to send a position of the first MEMS mirror 102a about the first scanning axis 110 to provide first position information to the system controller 106. Similarly, the second MEMS driver 116 is electrically coupled to the second MEMS mirror 102b to drive the second MEMS mirror 102b about the second scanning axis 112 and to send a position of the second MEMS mirror 102b about the second scanning axis 112 to provide second position information to the system controller 106.

As indicated above, FIG. 1B is provided merely as an example. Other examples are possible and may differ from what was described with regard to FIG. 1B. In practice, the 2D scanning system 100B may include additional components, fewer components, different components, or differently arranged components than those shown in FIG. 1B without deviating from the disclosure provided above. In addition, in some implementations, the 2D scanning system 100B may include one or more additional 1D MEMS mirrors or one or more additional light transmitters used to scan one or more additional field of views. Additionally, two or more components shown in FIG. 1B may be implemented within a single component, or a single component shown in FIG. 1B may be implemented as multiple, distributed components. Additionally, or alternatively, a set of components (e.g., one or more components) of the 2D scanning system 100B may perform one or more functions described as being performed by another set of components of the 2D scanning system 100B.

Figure 2:
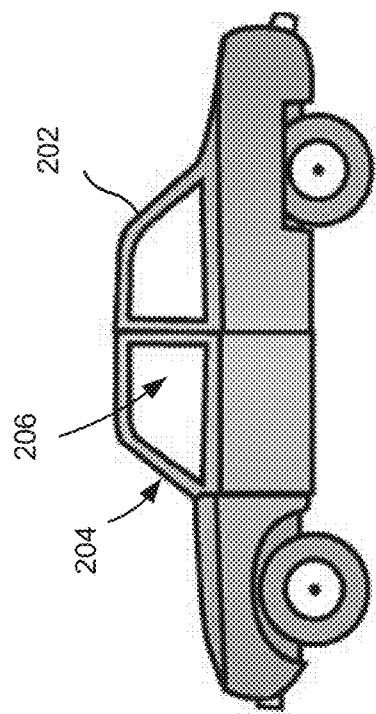
FIG. 2 shows an example vehicle according to one or more implementations.

FIG. 2 shows an example vehicle 200 according to one or more implementations. The vehicle 200 includes a vehicle chassis 202, a windshield 204 mounted to the vehicle chassis 202, and an in-cabin volume 206 that is defined by the vehicle chassis 202 and the windshield 204. The in-cabin volume 206 may be referred to as a passenger compartment of the vehicle 200 in which one or more passengers are located during use of the vehicle. While obscured from view, the vehicle 200 may also include a dashboard that includes a dashboard interior volume that is separated from the rest of in-cabin volume 206 by a dashboard housing.

As indicated above, FIG. 2 is provided as an example. Other examples may differ from what is described with regard to FIG. 2. For example, the vehicle may be any type of vehicle that includes a dashboard.

Figure 3A:
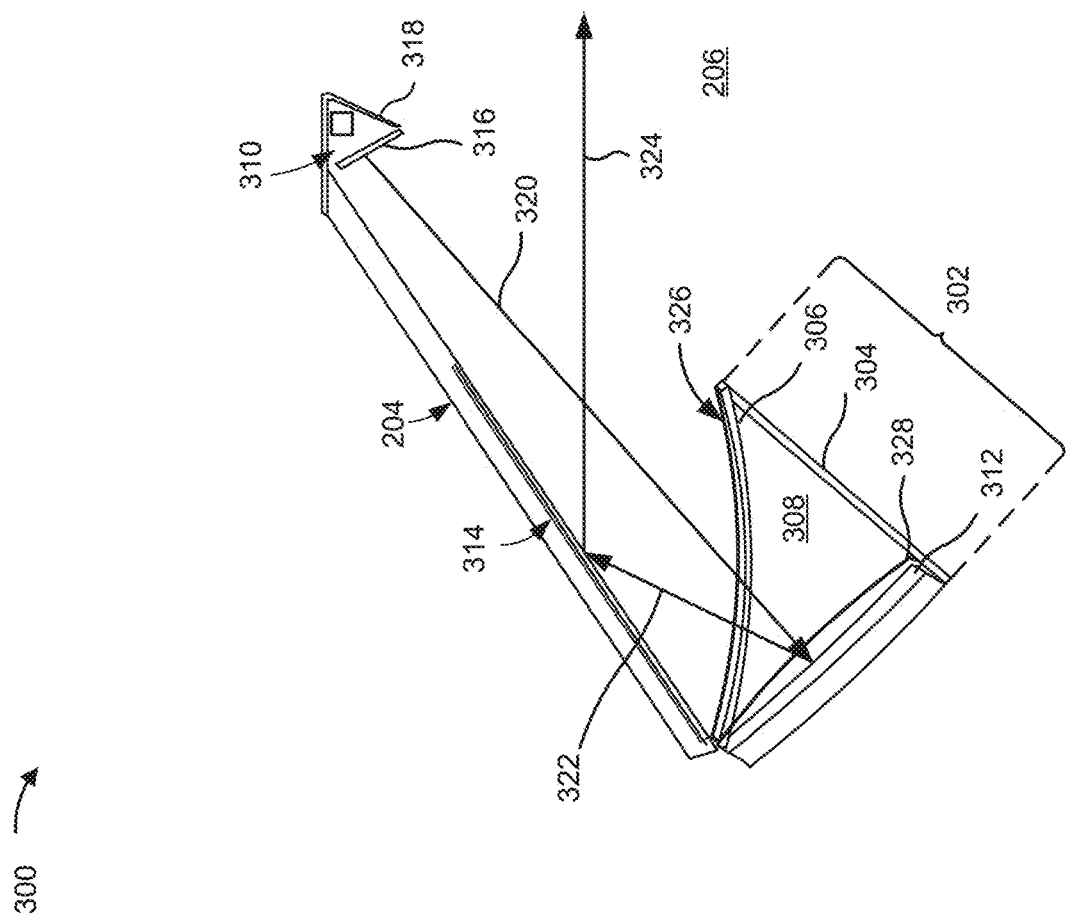
FIGS. 3A and 3B show an example image projection system according to one or more implementations.
Figure 3B:
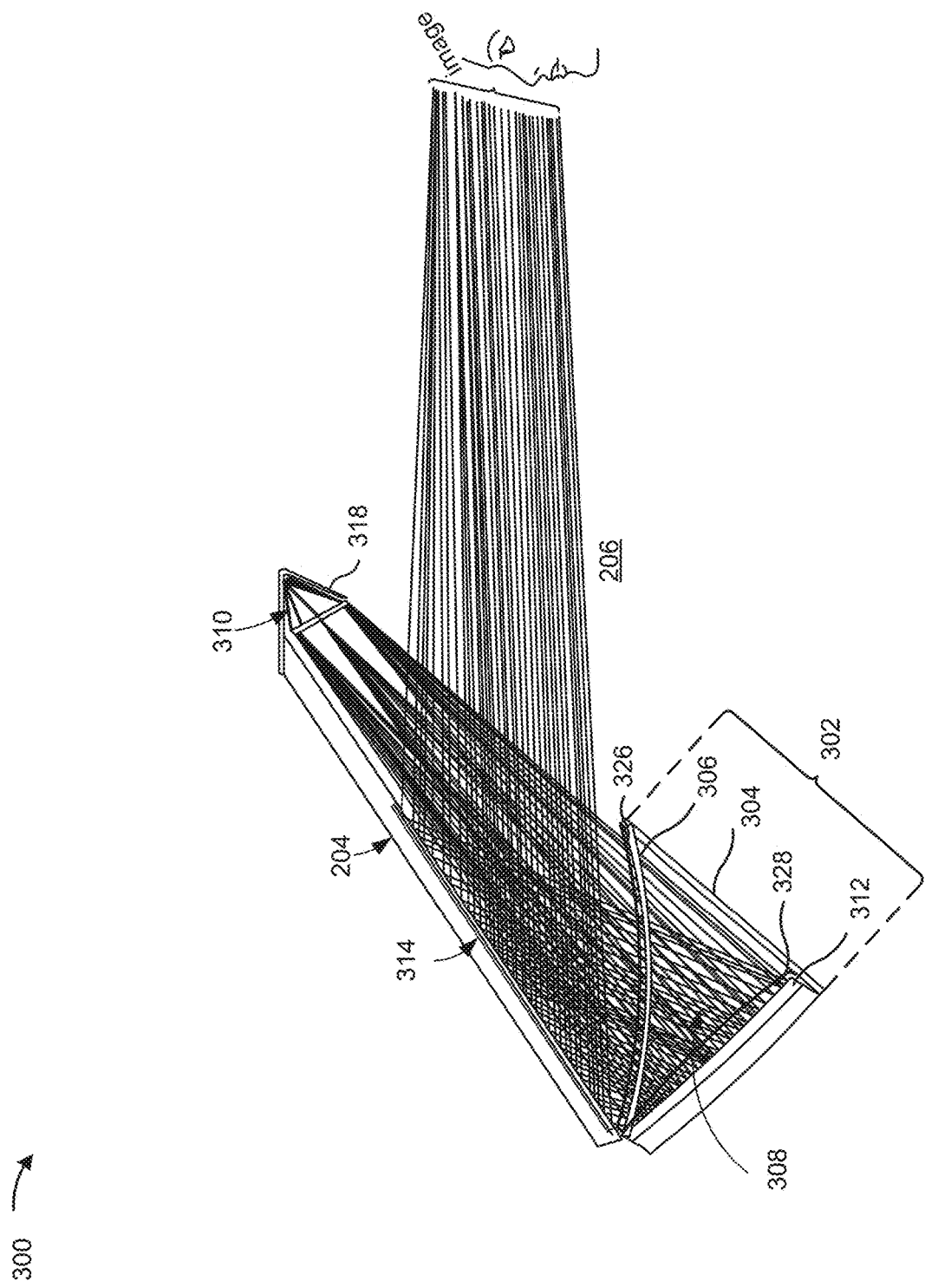

FIGS. 3A and 3B show an example image projection system 300 according to one or more implementations. In particular, FIG. 3A shows the image projection system 300 during a non-transmission of a pixel light beam and FIG. 3B shows the image projection system 300 during a transmission of a pixel light beam. Accordingly, FIG. 3B shows a full optical path (e.g., a full transmission path) of the pixel light beam. The image projection system 300 is arranged within a vehicle (e.g., vehicle 200) that includes the vehicle chassis 202 (not illustrated), the windshield 204, and the in-cabin volume 206. The vehicle further includes a dashboard 302 that has a housing 304, including a dashboard cover 306, that defines a dashboard interior volume 308 that is separated from the in-cabin volume 206. The dashboard cover 306 is a transparent cover that is transmissive to pixel light beams (e.g., RGB light beams). The dashboard cover 306 separates the in-cabin volume 206 and the dashboard interior volume 308. Moreover, the dashboard cover 306 is positioned on an optical path of the pixel light beams.

The image projection system 300 includes an image generation unit 310, a HUD reflector 312, and a windshield reflector 314. The image generation unit 310 is arranged within the in-cabin volume 206 and external to the dashboard interior volume 308, the HUD reflector 312 is arranged within the dashboard interior volume 308, and the windshield reflector 314 is mounted on or embedded in the windshield 204. The image generation unit 310 is configured to sequentially generate a plurality of pixel light beams corresponding to an image and, thereby, sequentially transmit the plurality of pixel light beams on the optical path towards the HUD reflector 312. In some implementations, the image generation unit 310 may include a 2D scanning system similar to the 2D scanning system 100A described in connection with FIG. 1A or similar to the 2D scanning system 100B described in connection with FIG. 1B. In some implementations, the image generation unit 310 may include a diffuser optical component 316, such as a diffuser lens, that assists in directing each of the plurality of pixel light beams towards the HUD reflector 312. In particular, the diffuser optical component 316, implemented as a diffuser, is configured to produce divergent light beams to increase an optical spread of each of the plurality of pixel light beams. By doing so, a beam width of the plurality of pixel light beams is increased by the diffuser optical component 316 in order to increase a size of an eyebox (e.g., a size of an area within the in-cabin volume 206 the at which the projected image can be perceived by the user). The size of the eyebox corresponds to a degree of beam divergence (e.g., an angle of divergence) produced by the diffuser optical component 316.

In some implementations, the image generation unit 310 is arranged laterally between a rear-view mirror 318 of the vehicle and the windshield 204. Arranging the image generation unit 310 laterally between the rear-view mirror 318 and the windshield 204 allows the image generation unit 310 to be placed out of a direct line of sight of a driver and also enables a distance between the image generation unit 310 and the HUD reflector 312 to be maximized. A larger distance between the image generation unit 310 and the HUD reflector 312 ultimately leads to a simplification of HUD reflector design especially when larger images are to be produced on the windshield 204. Therefore, maximizing the distance between the image generation unit 310 and the HUD reflector 312 is beneficial for producing larger images on a display area of the windshield 204.

As noted above, the HUD reflector 312 is arranged within the dashboard interior volume 308. In particular, the HUD reflector 312 is positioned along a rear wall of the housing 304, across the in-cabin volume 206 from the dashboard cover 306. The HUD reflector 312 is arranged on a first optical path 320 of the plurality of pixel light beams that extends between the image generation unit 310 and the HUD reflector 312. The first optical path 320 includes a first portion that is provided in the in-cabin volume 206 and external to the dashboard interior volume 308 and a second portion that is provided inside the dashboard interior volume 308. The HUD reflector 312 is arranged on the second portion of the first optical path 320 and the HUD reflector 312 is configured to receive each of the plurality of pixel light beams from the image generation unit 310 and project the image onto the windshield 204 (e.g., onto the windshield reflector 314) by reflecting each of the plurality of pixel light beams back along a second optical path 322 into the in-cabin volume 206 and onto the windshield 204. Due to the distance between the image generation unit 310 and the HUD reflector 312, which corresponds to a length of the first optical path 320, a larger image projection onto the windshield 204 can be enabled by a simplified and low aberration optical design than would otherwise be possible if the image generation unit 310 was placed within the dashboard interior volume 308. For example, the image projection system 300 is capable of projecting images onto the windshield 204 with a size of 15°×5° or larger.

In some implementations, the HUD reflector 312 may be a single mirror structure or mirror substrate formed as a one-piece construction. The HUD reflector 312 may have a convex shape or convex contour that is designed to receive the plurality of pixel light beams and reflect the plurality of pixel light beams towards a display area of the windshield 204 (e.g., onto the windshield reflector 314). In some implementations, the HUD reflector 312 may comprise multiple mirror panels. However, forming the HUD reflector 312 as a one-piece construction may have advantages over multi-mirror configurations, including lower costs, lower system and assembly complexity, and improved image generation. For example, multi-mirror configurations may have gaps between neighboring mirror panels. Since light cannot be reflected in regions of the gaps where reflective material is absent, dark lines may be formed in the image when projected onto the windshield 204 by the HUD reflector 312 having a multi-mirror configuration. Thus, constructing the HUD reflector 312 with a one-piece construction may produce a cohesive image without any dark lines that may otherwise be created if multiple mirrors are used.

The windshield reflector 314 reflects each of the plurality of pixel light beams into the in-cabin volume 206 along a third optical path 324 towards a user, at which point the user perceives the projected image formed by the plurality of pixel light beams.

In some implementations, the image projection system 300 may include a filter structure 326 arranged on or integrated with the dashboard cover 306 (e.g., the transparent cover). The filter structure 326 may include one or more films and/or one or more substrates configured to permit desired characteristics of light to pass into the dashboard interior volume 308 and filter out or block undesired characteristics of light (e.g., to prevent light with the undesired characteristic from entering the dashboard interior volume 308). For example, ambient light may interfere with and obscure the projected image. For example, the ambient light that reaches the HUD reflector 312 may be reflected onto the second optical path 322 and the third optical path 324, resulting in glare spots. Not only may the ambient light case flare spots that can obscure the projected image, but the ambient light could also create glare that could blind the user.

The filter structure 326 may include an optical filter that is configured to pass the plurality of pixel light beams and attenuate frequencies of ambient light. For example, the optical filter may be a bandpass filter or a notch filter that allows a passage of light in a desired frequency band corresponding to the plurality of pixel light beams and filters out or otherwise attenuates frequencies outside of the desired frequency band, including frequencies corresponding to the ambient light. Thus, the optical filter may be used to block or reduce an amount of ambient light entering into the dashboard interior volume 308 and reaching the HUD reflector 312.

Additionally, or alternatively, the filter structure 326 may include a polarized filter arranged on or integrated with the dashboard cover 306 (e.g., the transparent cover). Because the plurality of pixel light beams and the ambient light have different polarizations, the polarized filter can be configured to pass the plurality of pixel light beams and attenuate ambient light. In other words, the polarized filter may be configured to filter out polarizations corresponding to the ambient light and pass a polarization corresponding to the plurality of pixel light beams (e.g., RGB light)

In some implementations, the image projection system 300 may include a filter structure 328 arranged on the HUD reflector 312 in order to prevent ambient light that reaches the dashboard interior volume 308 from being directed along the second optical path 322. Thus, the amount of ambient light that may otherwise reach the windshield reflector 314 and the user can be reduced.

The filter structure 328 may include one or more films and/or one or more substrates configured to permit desired characteristics of light to pass onto the second optical path 322 and filter out or block undesired characteristics of light (e.g., to prevent light with the undesired characteristic from being transmitted along the second optical path 322). The filter structure 328 may include an optical filter that is configured to pass the plurality of pixel light beams and attenuate frequencies of ambient light. For example, the optical filter may be a bandpass filter or a notch filter that allows a passage of light in a desired frequency band corresponding to the plurality of pixel light beams and filters out or otherwise attenuates frequencies outside of the desired frequency band, including frequencies corresponding to the ambient light. Additionally, or alternatively, the filter structure 328 may include a polarized filter arranged on the HUD reflector 312.

The filter structure 326 and the filter structure 328 may be implemented in any combination. For example, in some implementations, the filter structure 326 may be present and the filter structure 328 may not be present, or vice versa. In some implementations, both the filter structure 326 and the filter structure 328 may be present. In some implementations, the filter structure 326 may include an optical filter and the filter structure 328 may include a polarized filter, or vice versa. In some implementations, the filter structure 326 may include a first optical filter and a first polarized filter, and the filter structure 328 may include a second optical filter and a second polarized filter. The filter characteristics of the first optical filter and the second optical filter may be the same or different. Configuring the first optical filter and the second optical filter with different filter characteristics may provide a diversity in filtering that may be used to improve glare reduction. Likewise, the filter characteristics of the first polarized filter and the second polarized filter may be the same or different. Configuring the first polarized filter and the second polarized filter with different filter characteristics may provide a diversity in filtering that may be used to improve glare reduction and reduce image obfuscation.

By positioning the image generation unit 310 outside of the dashboard interior volume 308, the integration of components within the dashboard interior volume 308 can be simplified and aids in simplifying the design against sun load (e.g., ambient light) that would otherwise negatively impact a quality of the projected image.

As indicated above, FIGS. 3A and 3B are provided merely as examples. Other examples are possible and may differ from what was described with regard to FIGS. 3A and 3B. In practice, the image projection system 300 may include additional components, fewer components, different components, or differently arranged components than those shown in FIG. 3 without deviating from the disclosure provided above. Additionally, two or more components shown in FIGS. 3A and 3B may be implemented within a single component, or a single component shown in FIGS. 3A and 3B may be implemented as multiple, distributed components. Additionally, or alternatively, a set of components (e.g., one or more components) of the image projection system 300 may perform one or more functions described as being performed by another set of components of the image projection system 300.

Figure 4:
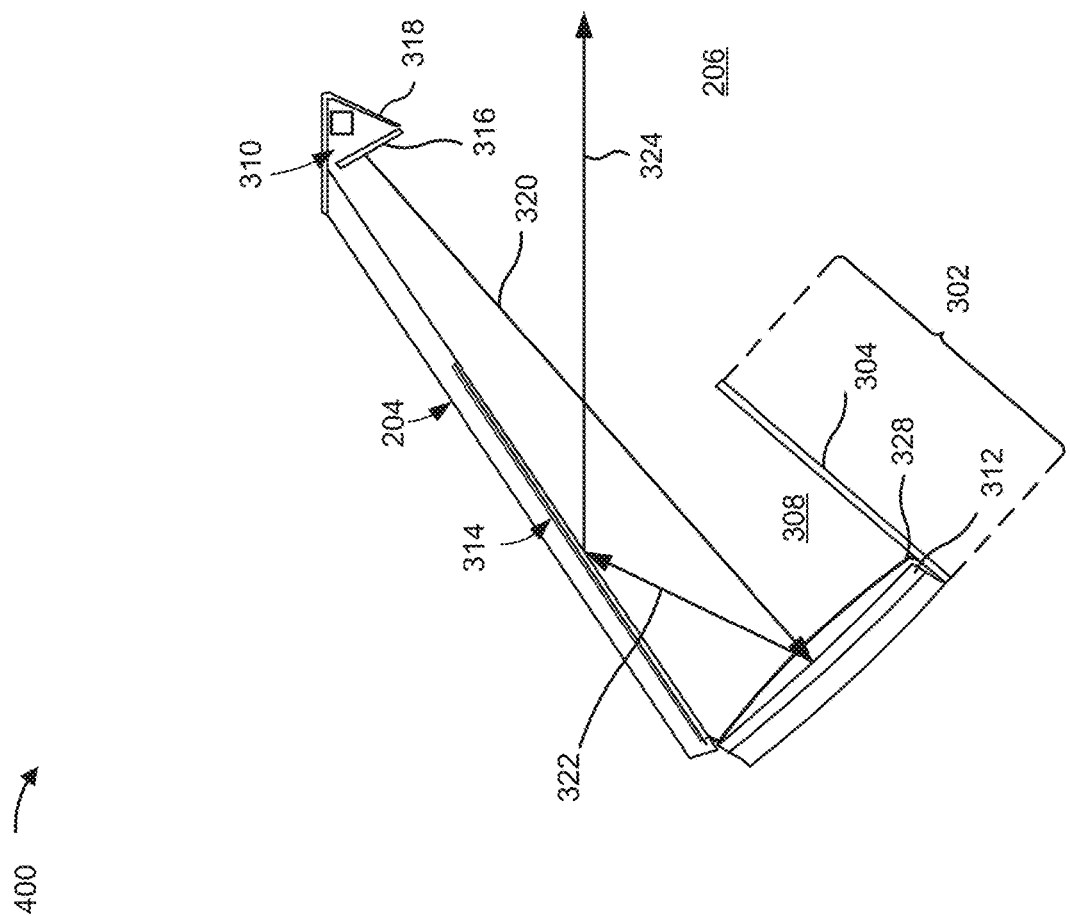
FIG. 4 shows an example image projection system according to one or more implementations.

FIG. 4 shows an example image projection system 400 according to one or more implementations. The image projection system 400 is similar to the image projection system 300 described in connection with FIGS. 3A and 3B, with the exception that the dashboard cover 306 is not present. Thus, there may be no separation between the in-cabin volume 206 and the dashboard interior volume 308.

The number and arrangement of components shown in FIG. 4 are provided as an example. In practice, the image projection system 400 may include additional components, fewer components, different components, or differently arranged components than those shown in FIG. 4.

The following provides an overview of some Aspects of the present disclosure:

Aspect 1: A vehicle, comprising: a vehicle chassis that defines an in-cabin volume of the vehicle; a windshield mounted to the vehicle chassis; a dashboard including a dashboard interior volume that is separated from the in-cabin volume; a head-up display (HUD) reflector arranged within the dashboard interior volume; and an image generation unit configured to generate a plurality of pixel light beams corresponding to an image and transmit the plurality of pixel light beams on an optical path towards the HUD reflector, wherein the image generation unit is arranged within the in-cabin volume and external to the dashboard interior volume, wherein the optical path includes a first portion that is provided in the in-cabin volume and external to the dashboard interior volume and a second portion that is provided in the dashboard interior volume, and wherein the HUD reflector is arranged on the second portion of the optical path and the HUD reflector is configured to receive the plurality of pixel light beams from the image generation unit and project the image onto the windshield by reflecting the plurality of pixel light beams back into the in-cabin volume and onto the windshield.

Aspect 2: The vehicle of Aspect 1, wherein the windshield comprises a windshield reflector configured to receive the plurality of pixel light beams from the HUD reflector and project the image into the in-cabin volume.

Aspect 3: The vehicle of any of Aspects 1-2, further comprising: a rear-view mirror, wherein the image generation unit is arranged laterally between the rear-view mirror and the windshield. wherein the image generation unit is arranged laterally between the rear-view mirror and the windshield.

Aspect 4: The vehicle of any of Aspects 1-3, further comprising: a transparent cover that separates the in-cabin volume and the dashboard interior volume, wherein the transparent cover is transmissive to the plurality of pixel light beams.

Aspect 5: The vehicle of Aspect 4, further comprising: an optical filter arranged on or integrated with the transparent cover, wherein the optical filter is configured to pass the plurality of pixel light beams and attenuate frequencies of ambient light.

Aspect 6: The vehicle of Aspect 5, wherein the pixel light beams are red-green-blue (RGB) light beams.

Aspect 7: The vehicle of Aspect 5, wherein the optical filter is a notch filter or a band-pass filter.

Aspect 8: The vehicle of Aspect 4, further comprising: a polarized filter arranged on or integrated with the transparent cover, wherein the polarized filter is configured to pass the plurality of pixel light beams and attenuate ambient light.

Aspect 9: The vehicle of Aspect 4, further comprising: an optical filter arranged on or integrated with the transparent cover, wherein the optical filter is configured to pass the plurality of pixel light beams and attenuate frequencies of ambient light; and a polarized filter arranged on or integrated with the transparent cover, wherein the polarized filter is configured to pass the plurality of pixel light beams and attenuate the ambient light.

Aspect 10: The vehicle of any of Aspects 1-9, further comprising: an optical filter arranged on the HUD reflector, wherein the optical filter is configured to pass the plurality of pixel light beams and attenuate frequencies of ambient light.

Aspect 11: The vehicle of any of Aspects 1-10, further comprising: a polarized filter arranged on the HUD reflector, wherein the polarized filter is configured to pass the plurality of pixel light beams and attenuate ambient light.

Aspect 12: The vehicle of any of Aspects 1-11, further comprising: an optical filter arranged on the HUD reflector, wherein the optical filter is configured to pass the plurality of pixel light beams and attenuate frequencies of ambient light; and a polarized filter arranged on the HUD reflector, wherein the polarized filter is configured to pass the plurality of pixel light beams and the attenuate the ambient light.

Aspect 13: The vehicle of any of Aspects 1-12, further comprising: a transparent cover that separates the in-cabin volume and the dashboard interior volume, wherein the transparent cover is transmissive to the plurality of pixel light beams; an optical filter configured to pass the plurality of pixel light beams and attenuate frequencies of ambient light; and a polarized filter configured to pass the plurality of pixel light beams and attenuate the ambient light, wherein the optical filter is arranged on or integrated with the transparent cover and the polarized filter arranged on the HUD reflector, or wherein the polarized filter is arranged on or integrated with the transparent cover and the optical filter arranged on the HUD reflector. wherein the optical filter is arranged on or integrated with the transparent cover and the polarized filter arranged on the HUD reflector, or wherein the polarized filter is arranged on or integrated with the transparent cover and the optical filter arranged on the HUD reflector.

Aspect 14: The vehicle of any of Aspects 1-13, wherein the image generation unit comprises: a light transmitter configured to generate and transmit the plurality of pixel light beams; and a two-dimensional scanner comprising at least one microelectromechanical system (MEMS) mirror, wherein the two-dimensional scanner is configured to receive the plurality of pixel light beams from the light transmitter and steer the plurality of pixel light beams onto the optical path according to a two-dimensional scanning pattern. a light transmitter configured to generate and transmit the plurality of pixel light beams; and a two-dimensional scanner comprising at least one microelectromechanical system (MEMS) mirror, wherein the two-dimensional scanner is configured to receive the plurality of pixel light beams from the light transmitter and steer the plurality of pixel light beams onto the optical path according to a two-dimensional scanning pattern.

Aspect 15: The vehicle of Aspect 14, further comprising: a transparent cover that separates the in-cabin volume and the dashboard interior volume, wherein the transparent cover is transmissive to the plurality of pixel light beams; and an optical filter arranged on or integrated with the transparent cover, wherein the optical filter is configured to pass the plurality of pixel light beams and attenuate frequencies of ambient light.

Aspect 16: The vehicle of Aspect 14, further comprising: a transparent cover that separates the in-cabin volume and the dashboard interior volume, wherein the transparent cover is transmissive to the plurality of pixel light beams; and a polarized filter arranged on or integrated with the transparent cover, wherein the polarized filter is configured to pass the plurality of pixel light beams and attenuate ambient light.

Aspect 17: The vehicle of Aspect 14, further comprising: a transparent cover that separates the in-cabin volume and the dashboard interior volume, wherein the transparent cover is transmissive to the plurality of pixel light beams; an optical filter arranged on or integrated with the transparent cover, wherein the optical filter is configured to pass the plurality of pixel light beams and attenuate frequencies of ambient light; and a polarized filter arranged on or integrated with the transparent cover, wherein the polarized filter is configured to pass the plurality of pixel light beams and attenuate the ambient light.

Aspect 18: The vehicle of Aspect 14, further comprising: an optical filter arranged on the HUD reflector, wherein the optical filter is configured to pass the plurality of pixel light beams and attenuate frequencies of ambient light.

Aspect 19: The vehicle of Aspect 14, further comprising: a polarized filter arranged on the HUD reflector, wherein the polarized filter is configured to pass the plurality of pixel light beams and attenuate ambient light.

Aspect 20: The vehicle of Aspect 14, further comprising: an optical filter arranged on the HUD reflector, wherein the optical filter is configured to pass the plurality of pixel light beams and attenuate frequencies of ambient light; and a polarized filter arranged on the HUD reflector, wherein the notch filter is configured to pass the plurality of pixel light beams and attenuate the ambient light.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description, but is not intended to be exhaustive or to limit the implementations to the precise form disclosed. Modifications and variations are possible in light of the above disclosure or may be acquired from practice of the implementations.

For example, although implementations described herein relate to MEMS devices with a mirror, it is to be understood that other implementations may include optical devices other than MEMS mirror devices or other MEMS oscillating structures. In addition, although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations a single act may include or may be broken into multiple sub acts. Such sub acts may be included and part of the disclosure of this single act unless explicitly excluded.

Instructions may be executed by one or more processors, such as one or more central processing units (CPU), digital signal processors (DSPs), general purpose microprocessors, application specific integrated circuits (ASICs), field programmable logic arrays (FPLAs), or other equivalent integrated or discrete logic circuitry. Accordingly, the term "processor" or "processing circuitry" as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

Thus, the techniques described in this disclosure may be implemented, at least in part, in hardware, software executing on hardware, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

A controller including hardware may also perform one or more of the techniques described in this disclosure. Such hardware, software, and firmware may be implemented within the same device or within separate devices to support the various techniques described in this disclosure. Software may be stored on a non-transitory computer-readable medium such that the non-transitory computer readable medium includes a program code or a program algorithm stored thereon which, when executed, causes the controller, via a computer program, to perform the steps of a method.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A vehicle, comprising:
    a vehicle chassis that defines an in-cabin volume of the vehicle;
    a windshield mounted to the vehicle chassis;
    a dashboard including a dashboard interior volume that is separated from the in-cabin volume;
    a head-up display (HUD) reflector arranged within the dashboard interior volume; and
    an image generation unit configured to generate a plurality of pixel light beams corresponding to an image and transmit the plurality of pixel light beams on an optical path towards the HUD reflector, wherein the image generation unit is arranged within the in-cabin volume and external to the dashboard interior volume,
    wherein the optical path includes a first portion that is provided in the in-cabin volume and external to the dashboard interior volume and a second portion that is provided in the dashboard interior volume, and
    wherein the HUD reflector is arranged on the second portion of the optical path and the HUD reflector is configured to receive the plurality of pixel light beams from the image generation unit and project the image onto the windshield by reflecting the plurality of pixel light beams back into the in-cabin volume and onto the windshield.

2. The vehicle of claim 1, wherein the windshield comprises a windshield reflector configured to receive the plurality of pixel light beams from the HUD reflector and project the image into the in-cabin volume.

3. The vehicle of claim 1, further comprising:
    a rear-view mirror,
    wherein the image generation unit is arranged laterally between the rear-view mirror and the windshield.

4. The vehicle of claim 1, further comprising:
    a transparent cover that separates the in-cabin volume and the dashboard interior volume, wherein the transparent cover is transmissive to the plurality of pixel light beams.

5. The vehicle of claim 4, further comprising:
    an optical filter arranged on or integrated with the transparent cover, wherein the optical filter is configured to pass the plurality of pixel light beams and attenuate frequencies of ambient light.

6. The vehicle of claim 5, wherein the pixel light beams are red-green-blue (RGB) light beams.

7. The vehicle of claim 5, wherein the optical filter is a notch filter or a band-pass filter.

8. The vehicle of claim 4, further comprising:
    a polarized filter arranged on or integrated with the transparent cover, wherein the polarized filter is configured to pass the plurality of pixel light beams and attenuate ambient light.

9. The vehicle of claim 4, further comprising:
    an optical filter arranged on or integrated with the transparent cover, wherein the optical filter is configured to pass the plurality of pixel light beams and attenuate frequencies of ambient light; and
a polarized filter arranged on or integrated with the transparent cover, wherein the polarized filter is configured to pass the plurality of pixel light beams and attenuate the ambient light.

10. The vehicle of claim 1, further comprising:
an optical filter arranged on the HUD reflector, wherein the optical filter is configured to pass the plurality of pixel light beams and attenuate frequencies of ambient light.

11. The vehicle of claim 1, further comprising:
a polarized filter arranged on the HUD reflector, wherein the polarized filter is configured to pass the plurality of pixel light beams and attenuate ambient light.

12. The vehicle of claim 1, further comprising:
an optical filter arranged on the HUD reflector, wherein the optical filter is configured to pass the plurality of pixel light beams and attenuate frequencies of ambient light; and
a polarized filter arranged on the HUD reflector, wherein the polarized filter is configured to pass the plurality of pixel light beams and attenuate the ambient light.

13. The vehicle of claim 1, further comprising:
a transparent cover that separates the in-cabin volume and the dashboard interior volume, wherein the transparent cover is transmissive to the plurality of pixel light beams;
an optical filter configured to pass the plurality of pixel light beams and attenuate frequencies of ambient light; and
a polarized filter configured to pass the plurality of pixel light beams and attenuate the ambient light,
wherein the optical filter is arranged on or integrated with the transparent cover and the polarized filter arranged on the HUD reflector, or
wherein the polarized filter is arranged on or integrated with the transparent cover and the optical filter arranged on the HUD reflector.

14. The vehicle of claim 1, wherein the image generation unit comprises:
a light transmitter configured to generate and transmit the plurality of pixel light beams; and
a two-dimensional scanner comprising at least one microelectromechanical system (MEMS) mirror, wherein the two-dimensional scanner is configured to receive the plurality of pixel light beams from the light transmitter and steer the plurality of pixel light beams onto the optical path according to a two-dimensional scanning pattern.

15. The vehicle of claim 14, further comprising:
a transparent cover that separates the in-cabin volume and the dashboard interior volume, wherein the transparent cover is transmissive to the plurality of pixel light beams; and
an optical filter arranged on or integrated with the transparent cover, wherein the optical filter is configured to pass the plurality of pixel light beams and attenuate frequencies of ambient light.

16. The vehicle of claim 14, further comprising:
a transparent cover that separates the in-cabin volume and the dashboard interior volume, wherein the transparent cover is transmissive to the plurality of pixel light beams; and
a polarized filter arranged on or integrated with the transparent cover, wherein the polarized filter is configured to pass the plurality of pixel light beams and attenuate ambient light.

17. The vehicle of claim 14, further comprising:
a transparent cover that separates the in-cabin volume and the dashboard interior volume, wherein the transparent cover is transmissive to the plurality of pixel light beams;
an optical filter arranged on or integrated with the transparent cover, wherein the optical filter is configured to pass the plurality of pixel light beams and attenuate frequencies of ambient light; and
a polarized filter arranged on or integrated with the transparent cover, wherein the polarized filter is configured to pass the plurality of pixel light beams and attenuate the ambient light.

18. The vehicle of claim 14, further comprising:
an optical filter arranged on the HUD reflector, wherein the optical filter is configured to pass the plurality of pixel light beams and attenuate frequencies of ambient light.

19. The vehicle of claim 14, further comprising:
a polarized filter arranged on the HUD reflector, wherein the polarized filter is configured to pass the plurality of pixel light beams and attenuate ambient light.

20. The vehicle of claim 14, further comprising:
an optical filter arranged on the HUD reflector, wherein the optical filter is configured to pass the plurality of pixel light beams and attenuate frequencies of ambient light; and
a polarized filter arranged on the HUD reflector, wherein the optical filter is configured to pass the plurality of pixel light beams and attenuate the ambient light.

21. A vehicle, comprising:
a vehicle chassis that defines an in-cabin volume of the vehicle;
a windshield mounted to the vehicle chassis;
a dashboard including a dashboard volume;
a head-up display (HUD) reflector arranged within the dashboard volume; and
an image generation unit configured to generate a plurality of pixel light beams corresponding to an image and transmit the plurality of pixel light beams on an optical path towards the HUD reflector, wherein the image generation unit is arranged within the in-cabin volume,
wherein the optical path includes a first portion that is provided in the in-cabin volume and a second portion that is provided in the dashboard volume, and
wherein the HUD reflector is arranged on the second portion of the optical path and the HUD reflector is configured to receive the plurality of pixel light beams from the image generation unit and project the image onto the windshield by reflecting the plurality of pixel light beams onto the windshield.

* * * * *